United States Patent
Ewe

(10) Patent No.: US 9,069,627 B2
(45) Date of Patent: Jun. 30, 2015

(54) METHOD AND APPARATUS FOR PROVIDING A DYNAMIC EXECUTION ENVIRONMENT IN NETWORK COMMUNICATION BETWEEN A CLIENT AND A SERVER

(75) Inventor: Thomas Ewe, San Francisco, CA (US)

(73) Assignee: SYNACTIVE, INC., Foster City, CA (US)

( * ) Notice: Subject to any disclaimer, the term of this patent is extended or adjusted under 35 U.S.C. 154(b) by 267 days.

(21) Appl. No.: 13/489,677

(22) Filed: Jun. 6, 2012

(65) Prior Publication Data

US 2013/0332506 A1    Dec. 12, 2013

(51) Int. Cl.
  *G06F 15/16*  (2006.01)
  *G06F 9/54*  (2006.01)
  *G06F 9/44*  (2006.01)

(52) U.S. Cl.
  CPC  *G06F 9/541* (2013.01); *G06F 8/38* (2013.01); *G06F 9/4445* (2013.01)

(58) Field of Classification Search
  USPC .................. 709/201, 203; 715/744, 746, 749
  See application file for complete search history.

(56) References Cited

U.S. PATENT DOCUMENTS

| | | | |
|---|---|---|---|
| 6,058,375 A | 5/2000 | Park |
| 6,108,309 A | 8/2000 | Cohoe et al. |
| 6,397,220 B1 | 5/2002 | Deisinger et al. |
| 6,760,745 B1 | 7/2004 | Tan et al. |
| 6,822,663 B2 | 11/2004 | Wang et al. |
| 6,970,823 B1 | 11/2005 | Yago et al. |
| 6,993,712 B2 | 1/2006 | Ramachandran et al. |
| 7,093,195 B2 | 8/2006 | Lynch et al. |
| 7,137,127 B2 | 11/2006 | Slotznick |
| 7,234,111 B2 | 6/2007 | Chu et al. |
| 7,278,110 B1 | 10/2007 | Wugofski |
| 7,386,485 B1 | 6/2008 | Mussman et al. |

(Continued)

FOREIGN PATENT DOCUMENTS

| | | |
|---|---|---|
| KR | 1020010043107 A | 5/2001 |
| KR | 1020080024617 A | 3/2008 |

(Continued)

OTHER PUBLICATIONS

GuiXT Designer Configuration Guide, GuiXT® by Synactive, 2009, Synactive, Inc. Foster City, CA, 13 pages.

(Continued)

*Primary Examiner* — Liangche A Wang
*Assistant Examiner* — Cheikh Ndiaye
(74) *Attorney, Agent, or Firm* — Procopio Cory Hargreaves & Savitch LLP; Ernest C. Huang; Pattric J. Rawlins

(57) ABSTRACT

A computer implemented method and apparatus for providing a dynamic execution environment comprising receiving a base user interface from a server, creating and storing one or more intermediate representations (IR) which represent a mapping between the base user interface and a modified user interface, executing the one or more IRs to intercept network communication from the server, map between the base user interface and the modified user interface, and to send the modified user interface to one or more clients and executing the one or more IRs to intercept network communication from the one or more clients to the server with user data, map between the modified user interface and the base user interface, and to send the base user interface along with the user data to the server

12 Claims, 8 Drawing Sheets

(56) References Cited

U.S. PATENT DOCUMENTS

| | | |
|---|---|---|
| 7,493,591 B2 | 2/2009 | Charisius et al. |
| 7,568,167 B2 | 7/2009 | Van Dok et al. |
| 7,577,601 B1 | 8/2009 | Rademacher et al. |
| 7,752,299 B2 | 7/2010 | Bookman et al. |
| 7,792,784 B2 | 9/2010 | Gupta |
| 7,805,523 B2 | 9/2010 | Mitchell et al. |
| 7,809,600 B1 | 10/2010 | Como et al. |
| 7,899,763 B2 | 3/2011 | Machulsky et al. |
| 7,970,943 B2 | 6/2011 | Lin et al. |
| 8,010,605 B2 | 8/2011 | Chang |
| 8,166,130 B2 | 4/2012 | Reinart |
| 8,201,143 B2 * | 6/2012 | Reamey ............... 717/117 |
| 8,365,144 B1 * | 1/2013 | Webb .................... 717/109 |
| 8,370,751 B2 * | 2/2013 | Graeff et al. .......... 715/744 |
| 2002/0083154 A1 | 6/2002 | Auffray et al. |
| 2002/0120679 A1 * | 8/2002 | Hayton et al. ........ 709/203 |
| 2003/0014496 A1 | 1/2003 | Spencer et al. |
| 2003/0193521 A1 | 10/2003 | Chen et al. |
| 2003/0231750 A1 | 12/2003 | Janveja et al. |
| 2004/0109011 A1 | 6/2004 | Peterson, Jr. |
| 2004/0163046 A1 | 8/2004 | Chu et al. |
| 2004/0216036 A1 | 10/2004 | Chu et al. |
| 2006/0041618 A1 | 2/2006 | Chang |
| 2006/0212846 A1 | 9/2006 | O'Farrell et al. |
| 2006/0265662 A1 | 11/2006 | Gertzen |
| 2007/0094597 A1 | 4/2007 | Rostom |
| 2007/0112958 A1 | 5/2007 | Kim |
| 2007/0124670 A1 | 5/2007 | Finck et al. |
| 2007/0150820 A1 | 6/2007 | Salvo |
| 2007/0180386 A1 * | 8/2007 | Ballard et al. ........ 715/744 |
| 2007/0220527 A1 | 9/2007 | Tolgu et al. |
| 2007/0234235 A1 | 10/2007 | Scott |
| 2007/0238488 A1 | 10/2007 | Scott |
| 2007/0238489 A1 | 10/2007 | Scott |
| 2007/0256003 A1 | 11/2007 | Wagoner et al. |
| 2008/0040653 A1 | 2/2008 | Levine |
| 2008/0178073 A1 | 7/2008 | Gao et al. |
| 2009/0013267 A1 | 1/2009 | Cudich et al. |
| 2009/0013281 A1 | 1/2009 | Helfman et al. |
| 2009/0158147 A1 | 6/2009 | Amacker |
| 2009/0204583 A1 | 8/2009 | Hechler et al. |
| 2009/0228490 A1 | 9/2009 | Faenger |
| 2009/0318126 A1 | 12/2009 | Schimitzek |
| 2010/0005053 A1 | 1/2010 | Estes |
| 2010/0064230 A1 | 3/2010 | Klawitter et al. |
| 2010/0100823 A1 | 4/2010 | Ewe et al. |
| 2011/0111742 A1 | 5/2011 | Neil et al. |
| 2011/0307630 A1 | 12/2011 | Lange et al. |
| 2012/0027269 A1 | 2/2012 | Fidaleo et al. |
| 2012/0110209 A1 | 5/2012 | Bonefas et al. |
| 2013/0060845 A1 | 3/2013 | Chalana et al. |
| 2013/0097095 A1 | 4/2013 | Rumig et al. |
| 2013/0103391 A1 | 4/2013 | Millmore et al. |
| 2014/0033062 A1 | 1/2014 | Ewe |
| 2014/0082511 A1 | 3/2014 | Weissberg et al. |

FOREIGN PATENT DOCUMENTS

| | | |
|---|---|---|
| WO | 2008031625 A2 | 3/2008 |
| WO | 2010048274 A2 | 4/2010 |
| WO | 2014018933 A1 | 1/2014 |

OTHER PUBLICATIONS

GuiXT Designer Installation Guide, GuiXT® by Synactive, 2009, Synactive, Inc. Foster City, CA, 17 pages.

International Search Report and Written Opinion mailed on May 3, 2010 for PCT/US20091061469 in 6 pages.

International Preliminary Report on Patentability mailed on May 5, 2011 for PCT1US20091061469 in 5 pages.

International Search Report and Written Opinion mailed on Oct. 31, 2013 for PCT/US20131052403 in 10 pages.

International Preliminary Report on Patentability mailed on Feb. 5, 2015 for PCT/US2013/052403 in 7 pages.

* cited by examiner

METHOD AND APPARATUS FOR PROVIDING A DYNAMIC EXECUTION ENVIRONMENT IN NETWORK COMMUNICATION BETWEEN A CLIENT AND A SERVER

BACKGROUND OF THE INVENTION

1. Field of the Invention

The present disclosure generally relates to network based computer interaction and, more particularly, to a method and apparatus for providing a dynamic execution environment in network communication between a client and server.

2. Description of the Related Art

The ubiquitous nature of computer network access has ushered in a new age of interactivity. More and more applications are moving to a client/server model, where a local device contains a client for far more complex software executing on a remote system. As such, interface technology is advancing quickly to accommodate this paradigm shift.

However, such interfaces are typically static and tightly coupled to the specific application for which they are designed. It is typically not possible to customize or modify such an interface unless the application provides specific tools to do so. As such, data for these user interfaces is generally transported between the client and the server in some fixed format. Common formats for such data transmission include open standards such as Hypertext Markup Language (HTML) and proprietary formats as in business management suites such as SAP.

The client software typically interprets the data and renders the screen accordingly. User interface fields are displayed and navigation of the user interface is limited to what is provided by the server. However, in many situations it is desirable to make modifications to the user interface, such as for usability, personal preference, or to cater to different types of viewing devices. Such modifications necessitate changing both the layout and screen logic as experienced by the user, without modification of the client or server. Known solutions to the problem of altering the data flow between the client and the server involve complicated programming.

Therefore, there is a need in the art for a method and apparatus to implement a dynamic execution environment in network communication between a client and server such that data between a client and server are intercepted and modified on the fly and sent to its destination seamlessly.

SUMMARY OF THE INVENTION

In some embodiments, a computer implemented method is provided for providing a dynamic execution environment comprising receiving a base user interface from a server, creating and storing one or more intermediate representations (IR) which represent a mapping between the base user interface and a modified user interface, executing the one or more IRs to intercept network communication from the server, map between the base user interface and the modified user interface, and to send the modified user interface to one or more clients and executing the one or more IRs to intercept network communication from the one or more clients to the server with user data, map between the modified user interface and the base user interface, and to send the base user interface along with the user data to the server.

In some embodiments, the method comprises a computer implemented method for providing an event-trapping mechanism in a dynamic execution environment comprising creating one or more execution blocks, each associated with a sequence of screen events of a user interface, from a function stored in a script, storing the one or more execution blocks as handlers and executing the one or more handlers independently from each other, when the associated sequence of screen events for the handler is detected in network traffic.

In some embodiments, there is an apparatus for providing a dynamic execution environment comprising an execution environment for receiving a base user interface, an intermediate representation module (IRM) coupled to the execution environment for creating one or more intermediate representations (IRs) mapping between the base user interface and a modified user interface and an event trapping mechanism for intercepting network communication between a server and one or more clients, executing one or more event handlers associated with a modification in the modified user interface, and communicating with the intermediate representation module to perform mappings between the modified user interface and the base user interface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a computer implemented method for providing a dynamic execution environment. In an exemplary embodiment, the present invention provides for making modifications of a base user interface for a client device making the user interface easier to use, more compact, or more appropriate according to a client need. In this manner, only those clients which require the simplified view will see them, but other clients view the original base user interface, or a different modification thereof. The dynamic execution environment uses scripting languages as a means to modify the base user interface on the fly, such that the client is unaware of any modification and the backend server (a SAP database, application server, and the like) is also unaware, but operates as if the client is using the base user interface.

Figure 1:
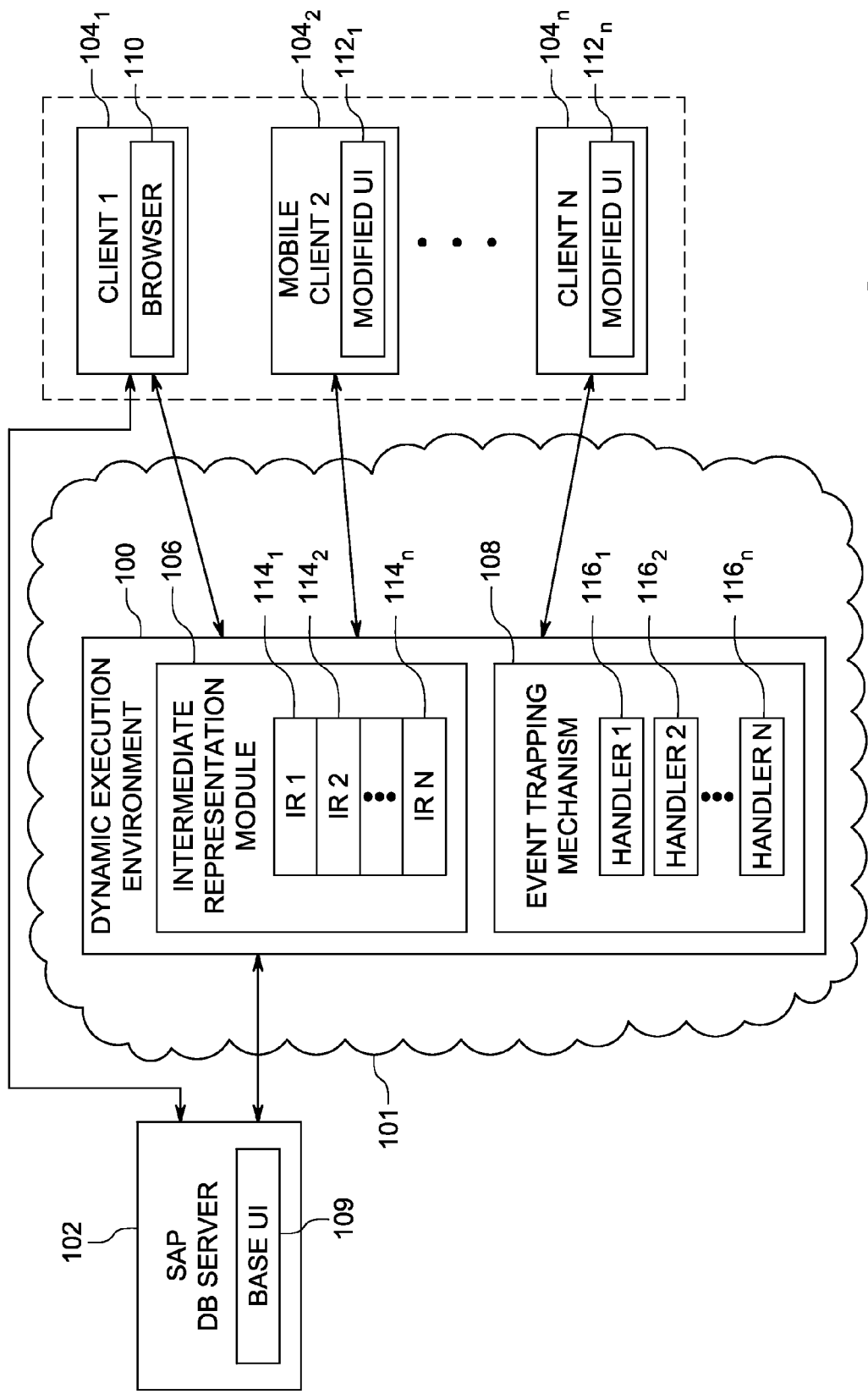
FIG. 1 depicts a functional diagram of an overview of the functionality of the dynamic execution environment according to an exemplary of the present invention.

FIG. 1 depicts a functional diagram of an overview of the functionality of the dynamic execution environment according to an exemplary of the present invention. A dynamic execution environment 100 sits on a network 101. In an exemplary embodiment, the dynamic execution environment 100 intercepts communications, for example, between a SAP database server 102 and one or more clients $104_{1 \ldots n}$. One of ordinary skill in the art would recognize that the server 102 can be any type of server, including, but not limited to, an application server, a web server, a database server and the like. The dynamic execution environment 100 comprises an intermediate representation module 106 and an event trapping mechanism 108. The intermediate representation module 106 further comprises one or more intermediate representations $114_{1 \ldots n}$. The event trapping mechanism 108 comprises one or more handlers $116_{1 \ldots n}$. The server 102 outputs a base user interface 109 which is directly sent through the network 101 to the client $104_1$. The client $104_1$ views the base user interface 109 in a browser 110. Alternatively, there are clients $104_{2 \ldots n}$ which are unable to view the base user interface 109 in a browser without difficulty, or it may be more convenient or useful to view the base user interface 109 in a different form as a modified user interface $112_{1 \ldots n}$. Here, it is possible to have several different classes of clients who have differing modified user interfaces $112_{1 \ldots n}$ with unique intermediate representations $114_{1 \ldots n}$ and handlers $116_{1 \ldots n}$ associated with the clients.

When the clients $104_{2 \ldots n}$ try to interact with the SAP Database server 109, the dynamic execution environment 100 intercepts the communications, by filtering network traffic in between the server 102 and the clients $104_{2 \ldots n}$. When the dynamic execution environment 100 intercepts a request from client $104_2$ for example, the dynamic execution environment 100 fetches a base user interface 109 from the sap database server 102. The dynamic execution environment 100 then executes its intermediate representation module to modify the base user interface 109 and produce a modified user interface $112_1$ to send to client $104_2$.

Figure 2:
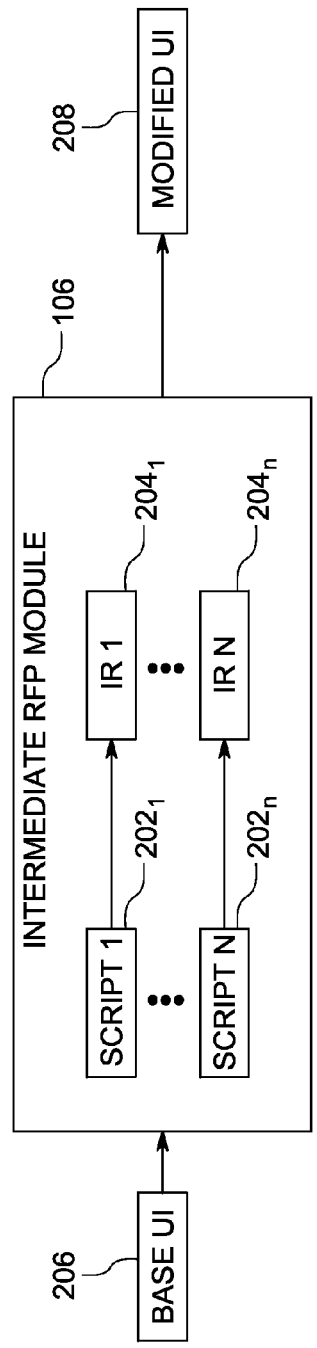
FIG. 2 depicts a functional diagram of an overview of an intermediate representation module according to an exemplary embodiment of the present invention.

FIG. 2 depicts a functional diagram of an overview of the intermediate representation module 106 from FIG. 1 according to an exemplary embodiment of the present invention. The diagram shows the process of converting a base user interface 206 to a modified user interface 208. The intermediate representation module 106 contains one or more scripts $202_{1 \ldots n}$ configured by an administrator of the network 101. These scripts $202_{1 \ldots n}$ are read by the intermediate representation module and converted into intermediate representations $204_{1 \ldots n}$. These intermediate representations $204_{1 \ldots n}$ each represent modifications to the base user interface 206. For example, the modification may include moving a user input box from one location to another, as discussed below with regards to FIG. 5. All of these modifications together operate on the base user interface 206 and output a modified user interface 208. The mapping between the base user interface 206 and the modified user interface 208 also operate in reverse fashion, such that the modified user interface 208 is subject to the intermediate representations $204_{1 \ldots n}$, to convert back to the base user interface 206. An example of a script $202_1$ follows.

```
if(_transaction == "MM02") {
    if(Z_SHOW_GUIXT == 1) {
        title('Change Material Attributes');
        pushbutton("[TOOLBAR]", "Show Standard SAP",
            {"process":do_scrn_toggle,
"using":{"l_set":"0"}});
        pushbutton("[TOOLBAR]", 'Start Over', {"process":mm02_reset});
            //Deletion of Toolbar Pushbutton not supported v1.1.39.2
        del("P[Select view(s)]");
        del("P[Organizational levels]");
        del("P[Data]");
        text([1,38], '&V[z_mm02_mat_desc]', {"size":39, "border":true});
        del("F[Change Number]");
        box([2,0], [21,49], 'Sales Org: 1000');
        text([3,1], 'Dist. Channel', {"size":13, "border":true});
            comment([4,4], '10', {"size":3});
        inputfield([4, 16], 'Price Book Print Restrictions', [4,46], {"size":3,
"name":"z_mm02_pricebook_restr_1000", "searchhelp":"H_TVM1"});
            comment([5,4], '10', {"size":3});
        checkbox([5, 16], 'Product Attribute 1',
            {"name":"z_mm02_small_rtl_book_print_1000"});
```

This script snippet shows, for example, that certain sections are deleted from the modified user interface 208 such as "Select Views", "Organizational Data" and the like, by the intermediate representation module 106 and then sent to the client $104_1$ as the modified user interface 208. In some instances text boxes are moved and check-boxes renamed, as examples of the types of modifications that are scripted for the base user interface 206. This script represents the intermediate representation used to convert from a base user interface 206 to a modified user interface 208.

Figure 3:
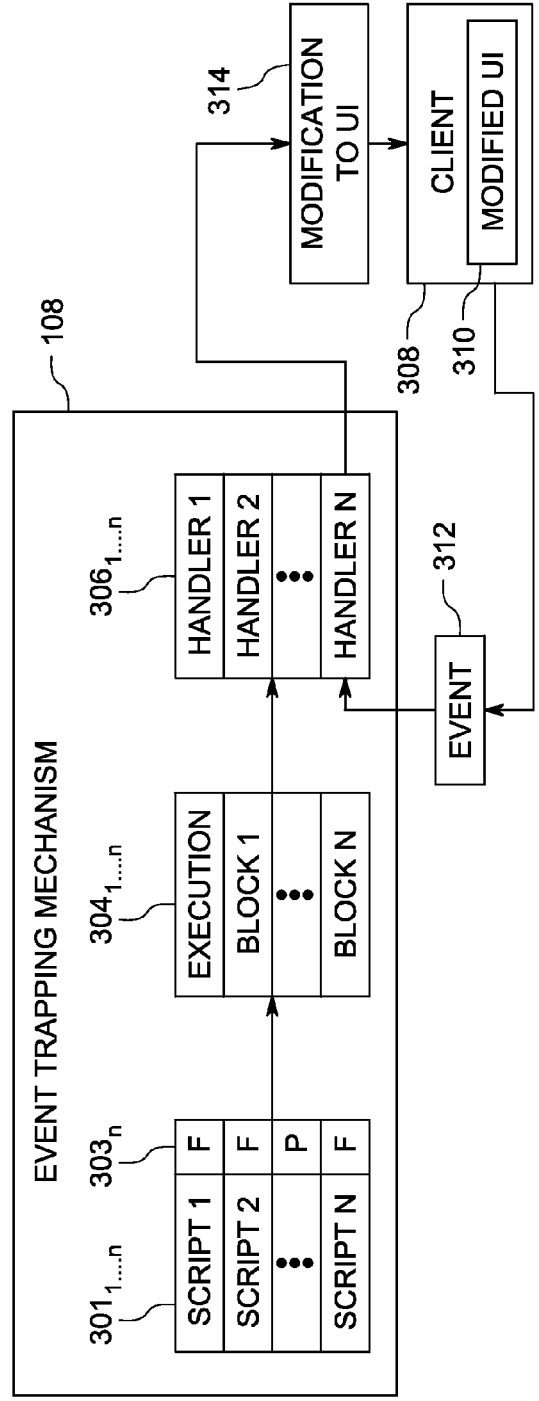
FIG. 3 depicts a functional diagram of an overview of an event trapping mechanism according to an exemplary embodiment of the present invention.

FIG. 3 depicts a functional diagram of an overview of the event trapping mechanism 108 of FIG. 1 according to an exemplary embodiment of the present invention. The event trapping mechanism 108 consists of one or more scripts $302_{1 \ldots n}$. These scripts are generally implemented in the JavaScript language, but one of ordinary skill in the art would recognize that any scripting or programming language may be used, including, but not limited to, Java, Ruby, Python and the like. The event trapping mechanism 108 reads the scripts $302_{1 \ldots n}$ and extracts execution blocks $304_{1 \ldots n}$ from script functions $303_n$. The execution blocks $304_{1 \ldots n}$ are then converted into event handlers $306_{1 \ldots n}$. These event handlers $306_{1 \ldots n}$ trap events produced by a screen associated with events from a modified user interface 310. For example, there is a client 308, currently viewing the modified user interface 310, as produced by the intermediate representation module 106 in the dynamic execution environment 100. The modified user interface 310 produces events such as "onenter" or "ondropdown", mouse clicks, keyboard key presses, cursor movements, touchpad presses, voice input, and the like. One of ordinary skill in the art would recognize that the present invention does not limit the types of events a user interface produces. The produced event 312 has an associated handler $306_n$ in the event trapping mechanism 108 which traps the event and responds accordingly. In one exemplary embodiment, the handler $306_n$ traps the event, and creates a modification to the user interface 314, sends that modification back to the client 308. Thus the modified user interface 310 is further modified according to the handler $306_n$. According to an exemplary embodiment of the present invention, the execution blocks $304_{1 \ldots n}$ from which handlers $306_n$ are extracted, are sequentially presented in the scripts $302_{1 \ldots n}$, but these handlers are no longer associated with sequential execution according to normal program function. The event trapping mechanism converts the handlers to operate asynchronously, i.e., on demand, as opposed to according to their sequential order in scripts $302_{1 \ldots n}$.

Figure 4:
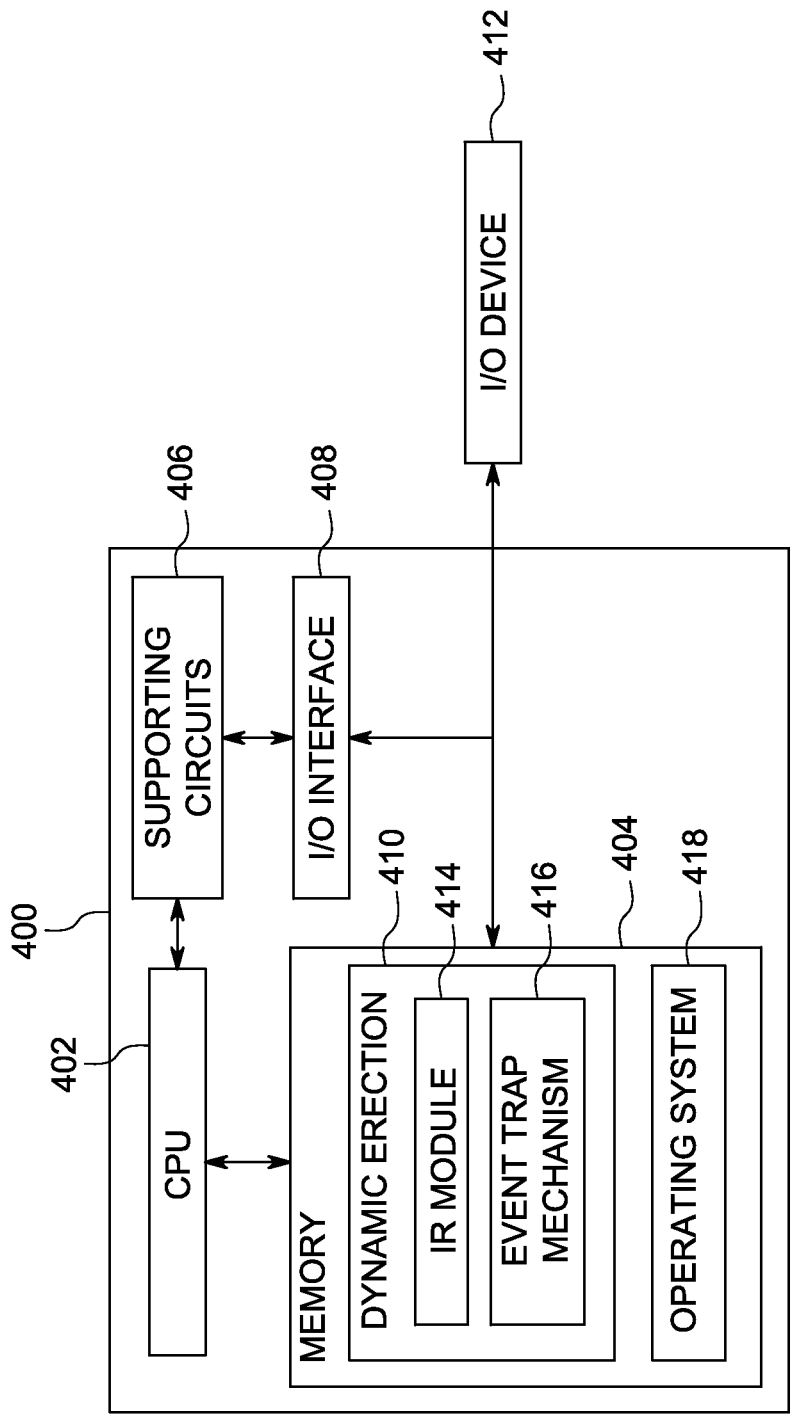
FIG. 4 depicts a block diagram of a computer in which an embodiment of the present invention is used.

FIG. 4 is a block diagram depicting an embodiment of a computer 400 providing a program interface in accordance with embodiments of the present invention. The computer is a computing device such as those generally known in the art. Such devices include desktop personal computers, laptops, smart-phones, personal digital assistants, and the like. The computer 400 includes a central processing unit (CPU) 402, memory 404 and support circuits 406. The CPU 102 comprises one or more commercially available microprocessors or microcontrollers that facilitate data processing and storage. The various support circuits 106 are utilized to facilitate the operation of the CPU 104 and include such circuits as clock circuits, power supplies, cache, input/output circuits, network devices, and the like.

The memory 404 comprises random access memory, read only memory, removable storage, flash memory, optical disk storage, disk drive storage, and combinations thereof. The support circuits 406 are coupled to an I/O interface 408, which in turn is connected to various I/O devices 412, including, but not limited to, mice, keyboards, displays and the like. The memory 404 stores an implementation of the dynamic execution environment 100 in FIG. 1 as a module 410, and the memory also stores an operating system 418. In operation, the CPU 402 executes the operating system 418 to control the general utilization and functionality of the computer 400. The dynamic execution environment 410 comprises an intermediate representation module 414 and an event trapping mechanism 416. The execution environment 410 allows for performing various operations and modifications of a received base user interface 109 from FIG. 1 to produce a modified user interface $11_{2_1 \ldots n}$. Examples of such modifications comprise at least drag and drop operations movement operations, deletions, additions, changing strings, and moving a cursor. One of ordinary skill in the art would recognize that additional modifications not mentioned can also be implemented by the present invention.

Figure 5:
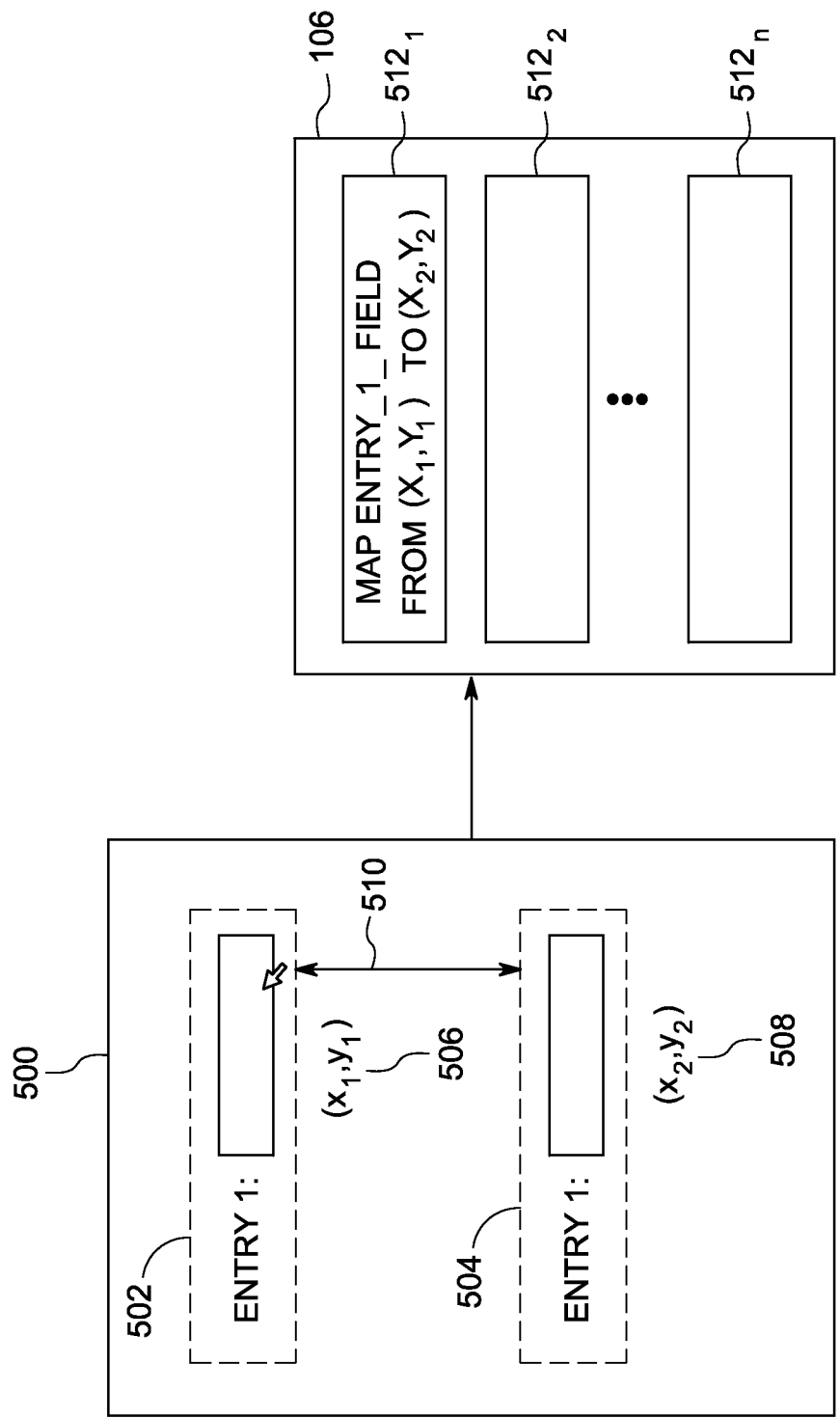
FIG. 5 depicts a functional diagram of the creation of an intermediate representation in accordance with embodiments of the present invention.

FIG. 5 is a functional diagram depicting the generation of a set of intermediate representations 118 from a base user interface 500, within the intermediate representation module 106. The base user interface 500 comprises a data entry control 502. For simplicity, this exemplary data entry control 502 is depicted as both a label and a data entry text box. In the base interface, the data entry control 502 is located at a particular set of screen coordinates 506, $(X_1, Y_1)$. A modification 510 is performed on the data entry control 502. In this particular example, the modification 510 is a drag and drop operation to move the data entry control 502 to another location on the display screen. The modified data entry control 504 represents the new location of the data entry control 502. The modified data entry control 504 is located at a second set of screen coordinates 508, $(X_2, Y_2)$.

The act of modifying the base user interface 500 causes the generation of one or more intermediate representations stored in intermediate representation module 106. While in the present example the movement of a control generates the intermediate representations, one of ordinary skill in the art would realize that the generation of the intermediate representations could occur as a result of the execution of a particular command, such as a "save" command. Such an operation would allow for multiple intermediate representations in intermediate representation module 106 for multiple controls to occur at once. The intermediate representations are comprised of one or more scripts $512_1, 512_2 \ldots 512_n$. The scripts 512 are later used to perform mapping operations between the modified user interface $112_n$ and the base user interface 109. In the present example, the script $512_1$ is newly generated in response to the operation 510 performed on the data entry control 502. The script $512_1$ states that the data entry 1 field (data entry control 502) located at $(X_1, Y_1)$ maps to the modified data entry control at $(X_2, Y_2)$. In this manner, the scripts 512 track and map modifications from the base user interface 109 to the modified user interface $112_n$. In some embodiments, the scripts 512 track the relationship between particular controls of the base user interface 109 and the modified user interface $112_n$, such as performing a direct mapping from a first control to a second control. In some embodiments, the scripts 512 perform the mapping between particular screen locations, such as by moving any data input at a point A on the modified user interface $112_n$ to a point B on the base user interface 109. The scripts 512 are then used to modify any outgoing data generated by the modified user interface $112_n$ to ensure a common data format with a remote device expecting data to be transmitted by the base user interface.

Figure 6:
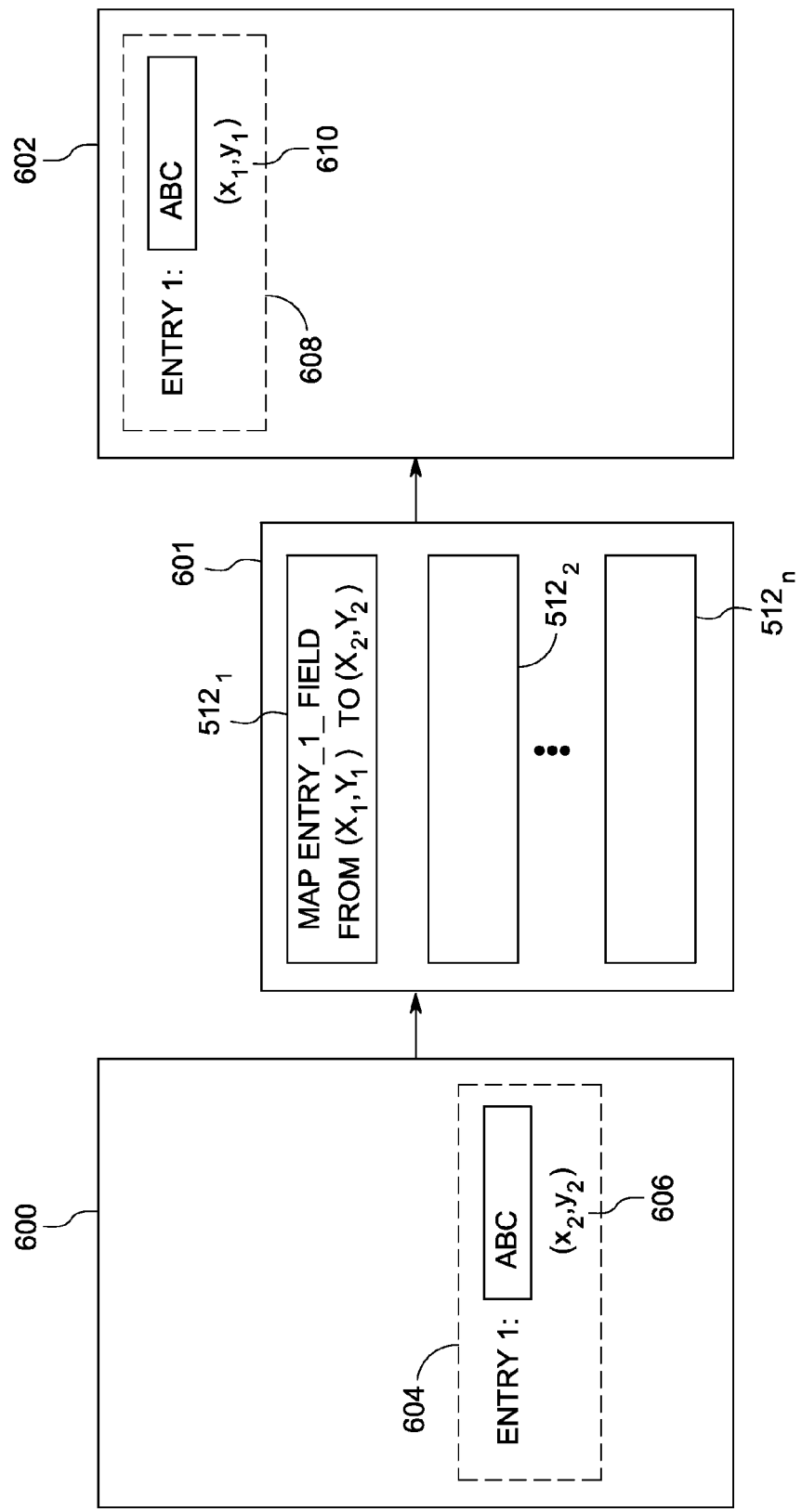
FIG. 6 depicts a functional diagram of the use of an intermediate representation to perform input operations from an internal source in accordance with embodiments of the present invention.

FIG. 6 is a functional diagram depicting an input operation from an external source as in the event trapping mechanism 108 in FIG. 1 in accordance with embodiments of the present invention. Functional elements of the figure include a modified user interface 600, a set of intermediate representations 601, and a base user interface 602. In some embodiments, the input is received via the event trapping mechanism 108 as discussed with respect to FIG. 1. In the present exemplary embodiment, the user has input a data value of "ABC" into the modified data entry control 604. Upon detection of the input value, the intermediate representations 601 perform a mapping on the outgoing data to change the screen location of the "ABC" input from the modified coordinates 606 $(X_2, Y_2)$ to the base coordinates 610 $(X_1, Y_1)$. As such, the data input ABC appears in the format of the base user interface 602 as expected by the device for which the data input is intended, even though the data was input into a modified data entry control 604 in a modified user interface 600. This is controlled by the event trapping mechanism 108 discussed above, where a handler is stored for base user interface 602 that controls the mapping of data entry control 608 between the base user interface 602 and the modified user interface 600. The event trapping mechanism 108 maps the execution blocks $304_n$ for a screen and the event to handlers $306_n$ in the intermediate representation 601. When a user modifies data entry control 604, the handler associated with that event is stored in the intermediate representation 601, and is executed, mapping the data entry control 604 to data entry control 608. The server storing the base user interface 602 is unaware that any modification has taken place.

Figure 7:
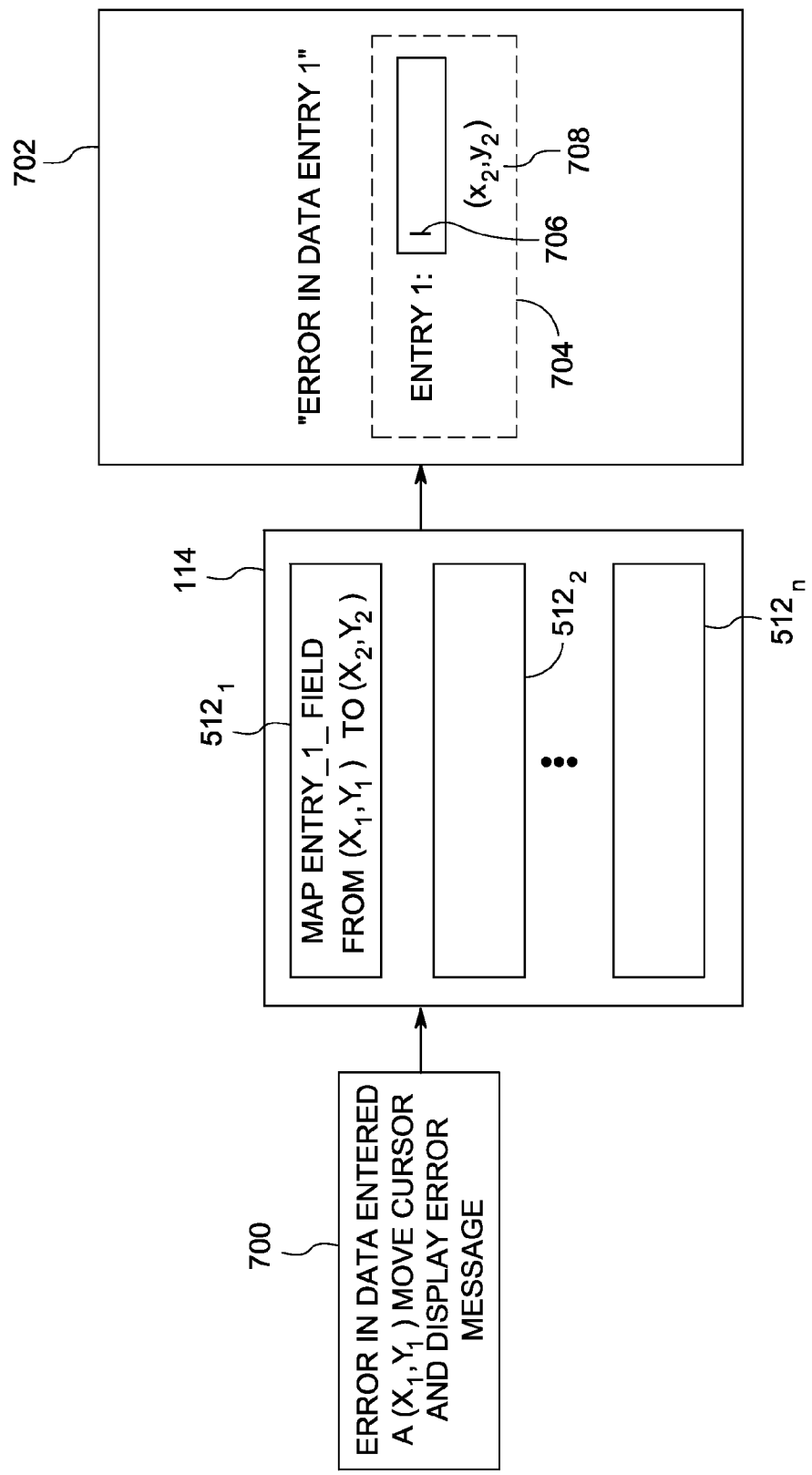
FIG. 7 depicts a functional diagram of the use of an intermediate representation to perform input operations from an external source in accordance with embodiments of the present invention.

FIG. 7 is a functional diagram depicting an input operation from an external source as executed by the intermediate representation module 106 in FIG. 1 in accordance with embodiments of the present invention. Functional elements of the figure include an external input 700, a set of intermediate representations $114_n$, and a modified user interface 702. In the present exemplary embodiment, the external input 700 is an error message, such as that received from a server. The external input 700 indicates that the interface should display an error message and move the cursor to the entry control where the erroneous input occurred. The external input 700 is interpreted by the intermediate representations $114_n$. In particular, the script $512_1$ that governs the modified data entry control 704 acts on the external input 700. The script 512 modifies the cursor placement operation so that instead of occurring at the coordinates of the control in the base user interface, $(X_1, Y_1)$, the cursor placement operation occurs at the site of the modified control 704 at coordinates $(X_2, Y_2)$ 708 in the modified interface 702. The cursor 706 is then placed within the modified data entry control 704 in accordance with the external input.

Figure 8:
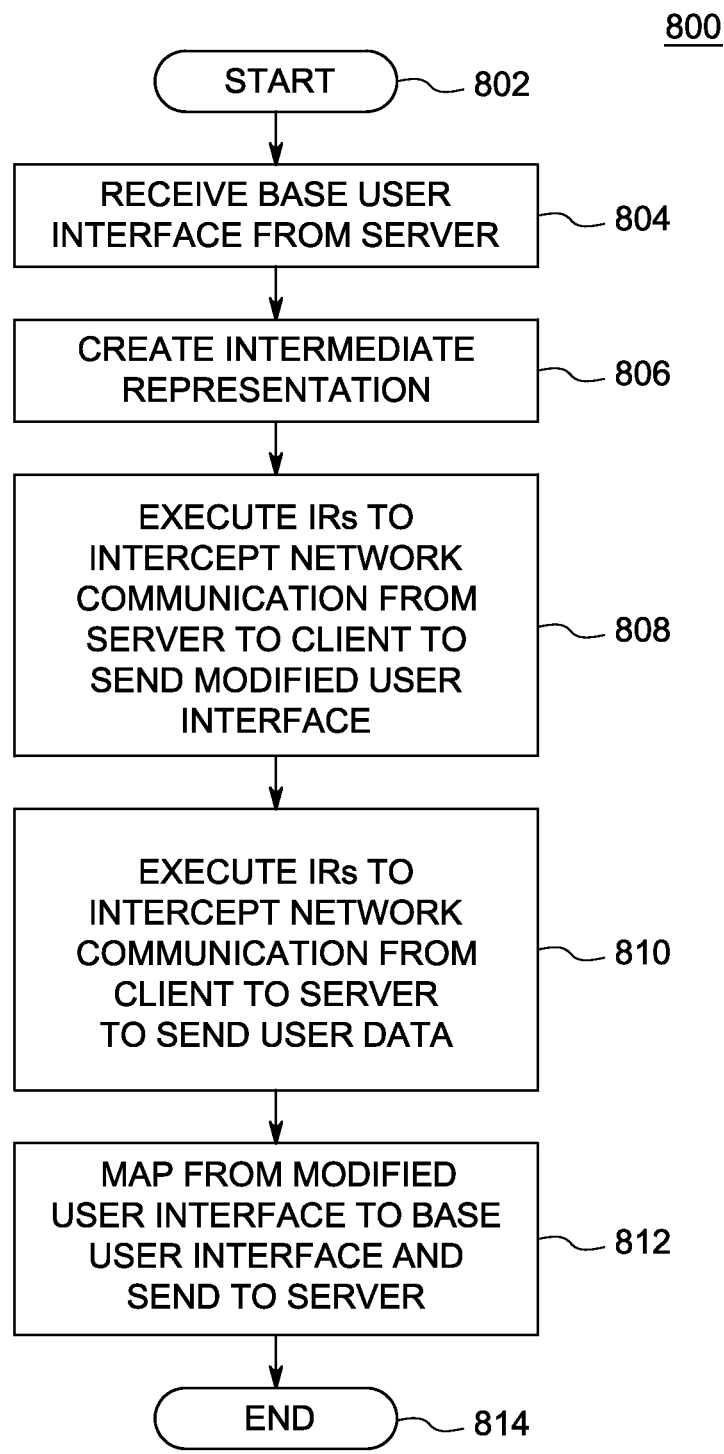
FIG. 8 depicts a flow diagram for providing a dynamic execution environment in accordance with embodiments of the present invention.

FIG. 8 is a flow diagram depicting operation of the dynamic execution environment 100 in FIG. 1 and element 410 in FIG. 4 in the computer 400. The method begins at step 802 and proceeds to step 804. At step 804, a base user interface is received from the server. At step 806, one or more intermediate representations are created for mapping between the base user interface and a modified user interface. These intermediate representations, discussed above, are formed by scripts custom written to control the UI controls in the modified user interface as well as to control UI behavior. At step 808, once a client tries to connect to a server to retrieve the base user interface, the intermediate representation module intercepts the network communication between the server and the client and sends the client the modified user interface. A user will be viewing a modified user interface according to the intermediate representation scripts. The user then modifies data in the controls and submits the data using the modified user interface. Once the client sends the modified user interface to the server with user data, the intermediate representation module once again intercepts the network communication between the client and the server at step 810. Execution then proceeds to step 812, where the modified user interface is mapped to the original base user interface, and the base user interface along with the user data reaches the server. The method 800 ends at step 814.

Figure 9:
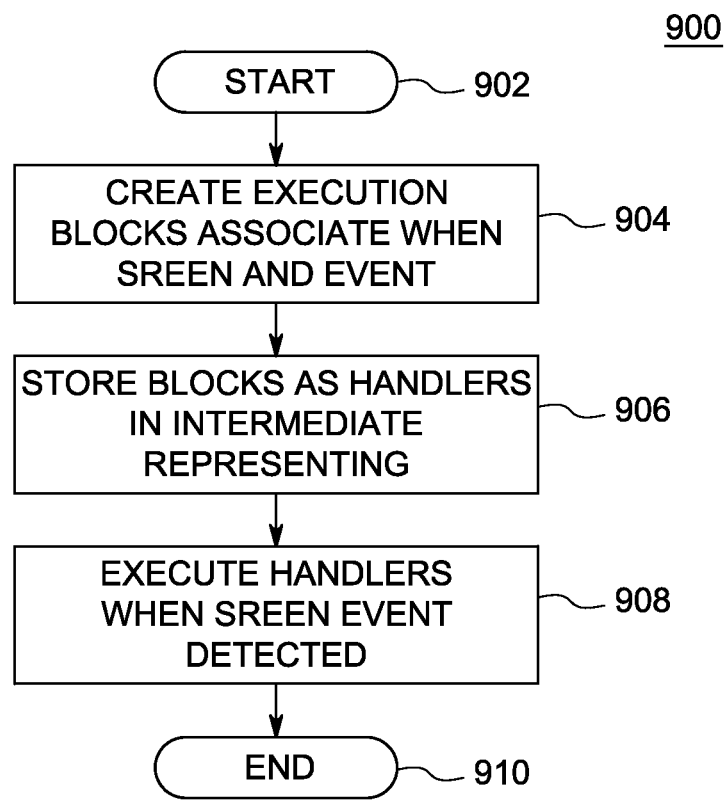
FIG. 9 depicts a flow diagram for providing an event trapping mechanism in a dynamic execution environment.

FIG. 9 is a flow diagram of a computer implemented method 900 for providing the event-trapping mechanism 416 in a dynamic execution environment 410 in the computer 400. The method 900 starts at step 902 and proceeds to step 904. At step 904, the method creates execution blocks from functions stored in a script. In an exemplary embodiment, the script is written in JavaScript. The function is written in JavaScript however it contains multiple entry points. The event trapping mechanism uses the multiple entry points to delineate and create execution blocks. Each execution block is associated with a sequence of screen events in a user interface and the position of the block in the code indicates the block's execution sequence. At step 906, each execution block is stored as a handler in the intermediate representation module, such that it is available for execution at the time when the associated screen appears. The execution blocks provide a sequence of screen events associated with a user's flow of using the application. In this manner, a screen can be made optional by removing it from a sequence of blocks. Once a block is executed, it will not be executed again, and correspondingly blocks of the same screen can appear more than once to indicate the order of the sequence of screens as they appear from the server. Accordingly, the method then proceeds to step 908 where a handler is executed when its associated sequence of screen events is detected. The method ends at step 910. The following code snippet is an example of the script that an event trapping mechanism will use to create handlers from execution blocks.

The following code is an example of code that is used for creating execution blocks:

```
function mm02_on_enter( ) {
    set("V[vdx]", '1'); //Counter for Sales Org.
    set("V[z_mm02_mat_no]", '&F[Material]');
    enter('/nmm03');
    onscreen 'SAPLMGMM.0060'
        NXT_SORG:
        set("F[Material]", '&V[z_mm02_mat_no]');
        enter('/5');
    onscreen 'SAPLMGMM.4000'
        set("V[z_mm02_mat_desc]", '&F[MAKT-MAKTX]');
        set("V[z_mm02_restr_code_&V[idx]_&V[vdx]000]",
```

-continued

```
            "&F[Material group 1]");
        set("V[z_test3]", '&F[Material group 1]');
        if(idx == 10) {
            set("V[z_mm02_pricebook_restr_&V[vdx]000]",
                '&F[Pricebook restriction]');
            set("V[z_mm02_small_rtl_book_print_&V[vdx]000]",
                '&C[Product attribute 1]');
            set("V[z_test4]", '&C[Product attribute 1]');
        }
}
```

In the above snippet of JavaScript code, execution blocks are extracted from the function mm_02_on_enter( ). There are several blocks of code in this function. For example, one block begins with the label "onscreen 'SAPLMGMM.0060'." This represents one of the execution blocks that will be used to create a handler, such that, in an exemplary embodiment, instead of entering into the function at the first line of the function, the event trigger will cause the function to begin executing on the line immediately following "onscreen 'SAPLMGMM.0060'" and end or return when an "entero" command is encountered. A similar execution is seen as being defined on the line "onscreen 'SAPLMGMM.4000'." The "onscreen" identifier represents an event on the modified user interface. In this instance, onscreen 'SAPLMGMM.4000' indicates when a page with an ID of SAPLMGMM gets invoked. Then, the set("V [z_mm02_pricebook_restr_&V[vdx]000]", '&F[Pricebook restriction]') is called, such that the z_mm02_pricebook_restr_&V[vdx]000] element of the base user interface is set to '&F[Pricebook restriction]', in addition to other modifications in the base user interface. In an exemplary embodiment of the present invention, the event trapping mechanism functions as an extension to standard JavaScript, expanding the functionality available in JavaScript and allowing it to handle execution blocks and the like. Also, since the sequence of screen events is coded in the same JavaScript function, local variable definitions can be used across handlers and execution blocks. This enables different screens to share data seamlessly. In addition, screen sequences allow for events to be circumvented, or skipped around using "goto" functionality as implemented in the extension. In other exemplary embodiments, extensions are made available to different programming languages, including, but not limited to, Ruby, PHP, Python, ASP.NET and the like, to provide for the implementation of an event trapping mechanisms as described above.

Embodiments of the instant invention are directed towards modifications of a user interface for a business enterprise client as described in commonly assigned patent application Ser. No. 61/342,372, which is herein incorporated by reference. In some embodiments, the instant invention is used to modify the interface of a mobile device to provide for full functionality of the business enterprise client while allowing modification of the interface to accommodate the unique challenges of providing a mobile device interface.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for providing a dynamic execution environment comprising:
   receiving a base user interface from a server;
   creating and storing one or more intermediate representations (IR) which represent a mapping between the base user interface and a modified user interface;
   intercepting a network communication from the server to one or more clients;
   executing the one or more IRs on the intercepted network communication from the server to the one or more clients and performing changes to the intercepted network communication by mapping between the base user interface and the modified user interface to convert the base user interface to the modified user interface, and to forward the intercepted and converted network communication to the one or more clients;
   intercepting a network communication from the one or more clients to the server; and
   executing the one or more IRs on the intercepted network communication from the one or more clients to the server with user data by performing event trapping on screen events on one or more screens of the modified user interface, map between the modified user interface and the base user interface to convert user input for the base user interface and to modify the user data to a format corresponding to the base user interface, and to send the converted input along with the modified user data in the form of modified network communication to the server.

2. The method of claim 1, wherein the modified user interface comprises at least one of a drag and drop operation, a deletion, a label change, or a font change.

3. The method of claim 1, wherein the one or more IRs are composed of one or more scripts.

4. The method of claim 3, wherein the one or more scripts are encoded in a scripted programming language.

5. The method of claim 1, wherein the one or more IRs are executed in a sequential order corresponding to an order in which one or more modifications were made to the base user interface to generate the modified user interface.

6. The method of claim 1, wherein if the server determines that a portion of the user data is invalid, the dynamic execution environment will execute one or more IRs to send the modified user interface to the one or more clients, along with error data and the user data.

7. An apparatus for providing a dynamic execution environment comprising:
   an execution environment for receiving a base user interface;
   an intermediate representation module (IRM) coupled to the execution environment for creating and storing one or more intermediate representations (IRs) mapping between the base user interface and a modified user interface and for intercepting network communication from a server to one or more clients to convert the base user interface to the modified user interface, and to forward the intercepted and converted network communication to the one or more clients; and
   an event trapping mechanism for intercepting network communication from the one or more clients to the server with user data by performing event trapping on screen events on one or more screens of the modified user interface, executing one or more event handlers associated with a modification in the modified user interface, and communicating with the intermediate representation module to perform mappings between the modified user interface and the base user interface to convert user input for the base user interface and to modify the user data to a format corresponding to the base user interface, and to send the converted input along with the modified user data in the form of modified network communication to the server mappings between the modified user interface and the base user interface.

8. The apparatus of claim 7, wherein the modified user interface comprises at least one of a drag and drop operation, a deletion, a label change, or a font change.

9. The apparatus of claim 7, wherein the one or more IRs are composed of one or more scripts.

10. The apparatus of claim 9, wherein the one or more scripts are encoded in a scripted programming language.

11. The apparatus of claim 7, wherein the one or more IRs are executed in a sequential order corresponding to an order in which one or more modifications were made to the base user interface to generate the modified user interface.

12. The apparatus of claim 7, wherein if the server determines that a portion of the user data is invalid, the dynamic execution environment will execute one or more IRs to send the modified user interface to the one or more clients, along with error data and the user data.

* * * * *